Nov. 22, 1966

U. MAKIRI 3,286,388

TELEPHONE ACCESSORY

Filed March 9, 1964

INVENTOR.
URIA MAKIRI
BY
Herzig & Walsh
ATTORNEYS

United States Patent Office 3,286,388
Patented Nov. 22, 1966

3,286,388

TELEPHONE ACCESSORY

Uria Makiri, 6137½ Saturn St., Los Angeles, Calif.

Filed Mar. 9, 1964, Ser. No. 350,441
7 Claims. (Cl. 40—336)

The present invention relates to a telephone accessory, and more particularly to a telephone base member which can be quickly and easily secured beneath a telephone to support a telephone directory or the like.

Frequently-called telephone numbers are sometimes recorded in a small book provided by the telephone company for this purpose. This book should be conveniently located adjacent the telephone for maximum usefulness. Since telephones are not always situated near storage space, there is sometimes no convenient place in which to keep the telephone book. If a convenient place is provided near the telephone, the book often becomes accidentally mislaid or covered with other material stored in the same space so that it is not readily available for use. Although the space under a telephone will accommodate such a book, it is inconvenient to utilize this space because the book is left behind each time the telephone is carried from one point of use to another.

Although telephone accessories are available which utilize the space beneath a telephone for the location of a telephone number index, these devices do have certain disadvantages.

One disadvantage resides in the fact that they are relatively expensive because they employ separate means to support telephone-number index cards plus guide means to guide the separate means into position under the telephone.

Another disadvantage resides in the fact that the space beneath the telephone is not utilized to fullest advantage because of the space occupied by the guide means.

Yet another disadvantage resides in the fact that, unless the cost of the accessory is increased by providing a cover member having a curved lip extending from the telephone, the index cards become frayed and torn from contacting the bottom of the telephone each time the index device is used.

A further disadvantage resides in the fact that these devices are usually designed in such a manner that the index cards are slid into position under the telephone between the front corner pads or feet thereof in a space which is too narrow to permit using the device for supporting the small telephone book commonly supplied by the telephone company.

In view of the foregoing factors and conditions characteristic of telephone accessories, it is a primary object of the present invention to provide a new and useful telephone base member not subject to the disadvantages enumerated above and including means for attaching the member to a telephone efficiently, expeditiously and economically.

Another object of the present invention is to provide a telephone accessory of the type described which has its corners cut away so that it will fit between pads of a desk-type telephone.

Yet another object of the present invention is to provide a device of the type described having means for releasably connecting it to a telephone in such a manner that the space beneath the telephone may be utilized to maximum advantage.

A further object of the present invention is to provide a base member for a desk-type telephone which may be attached to the bottom of a telephone in such a manner that a telephone book can be supported directly by the base member and wherein the means attaching the base member to the telephone are utilized as guide means to guide the book into position on the base member in the space beneath the telephone.

According to the present invention, a rectangular base member is provided. The base member has its corners cut away so that it will fit between the pad of a desk-type telephone. Suitable attachment means are employed to releasably connect the base member to the telephone in such a manner that the base member is maintained in contact with the surface supporting the telephone to provide the maximum space between the telephone base and the base member. Guide means for guiding a telephone book into position on the base member may be eliminated by utilizing the attachment means for this function.

The means employed to attach the base member to the telephone are arranged on the base member in such a manner that they are positionable between the front feet and the rear feet of the telephone along the front and rear edges thereof, thereby leaving free access to the space beneath the telephone between the feet along the sides of the telephone at its widest dimension. Thus, telephone directories which are too wide to be slid under a telephone from the front may be slid into position on the base member of the present invention and supported thereby. The surface upon which the base member rests may be protected by providing the underside of the base member with a suitable felt-like material.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

Figures 1, 2, 3, 4:
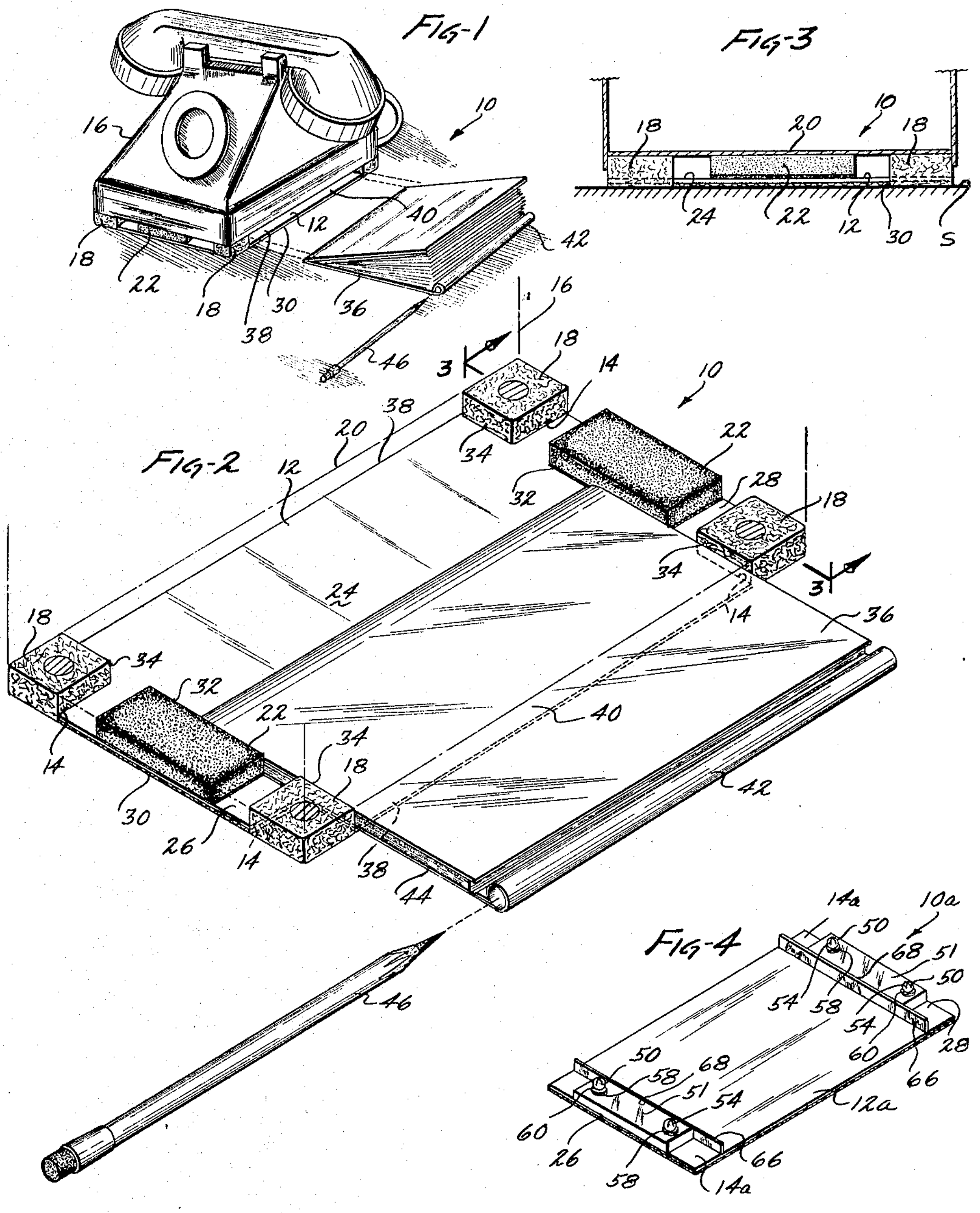
FIGURE 1 is a perspective view of a telephone incorporating a base member of the present invention shown in association with a telephone book and pencil which may be supported by the base member.
FIGURE 2 is an enlarged perspective view of the base member, book, pencil and a portion of the telephone shown in FIGURE 1.
FIGURE 3 is a cross-sectional view, on a reduced scale, taken along line 3—3 of FIGURE 2.
FIGURE 4 is a perspective view of a base member of the present invention having a modified attachment means.

Referring again to the drawings, and particularly to FIGURES 1–3, a telephone base member constituting a first embodiment of the present invention, generally designated 10, includes a shelf member 12 of generally rectangular shape which has its corners cut away to form recesses 14. The shelf 12 is dimensioned to fit beneath a desk-type telephone 16 in such a manner that the corner pads 18 thereof fit within the recesses 14.

The shelf 12 may be removably affixed to the bottom wall 20 of telephone 16 by a pair of permanent magnets 22. The magnets 22 are affixed to the upper side 24 of shelf 12 between recesses 14 at the front edge 26 and rear edge 28, respectively, thereof. The magnets 22 may be permanently affixed to the shelf 12 by a suitable adhesive and are adapted to adhere to the bottom wall 20 by magnetic attraction. The magnets 22 are preferably at least as thick as the pads 18 so that the shelf 12 will rest upon a suitable surface S upon which the telephone rests. A felt-like material 30 is provided on the undersurface of the shelf 12 to protect the surface S.

Preferably, the inner edges 32 of magnets 22 are aligned with the inner edges 34 of the pads 18 to serve as guides for guiding a suitable telephone book 36 into position between the upper surface 24 of shelf 12 and the bottom wall 20.

It is an important feature of the invention that the magnets 22 be located on the front edge 26 and the rear edge 28 of shelf 12 as distinguished from its sides 38 and that the magnets 22 be at least as thick as the pads 18 to provide a maximum passageway 40 beneath the telephone 16 for reception of the book 36.

A tubular member 42 may be affixed to one of the covers 44 of book 36 for the reception of a pencil 46 which may be used to record telephone numbers in the book 36. The pencil 46 and the tubular member 42 also serve as a handle to facilitate removing the book 36 from the shelf 12 or sliding the book into position thereon. The book 36 may be provided with scratch paper upon which messages may be recorded.

Figure 5:
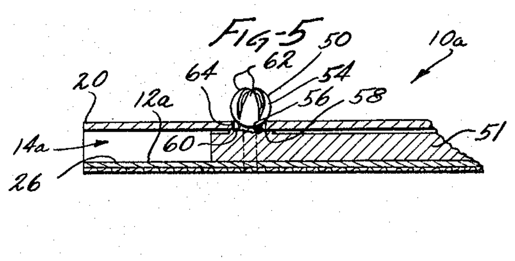
FIGURE 5 is an enlarged, cross-sectional view showing one of the fastening means of the telephone base of FIGURE 4 in position on a telephone bottom wall.

A second embodiment of the present invention, generally designated 10*a*, is shown in FIGURES 4 and 5 and is identical with the base member 10 except that the magnets 22 are replaced with snap fasteners 50 which may be affixed to a pair of blocks 51. The blocks 51 are attached to the edges 26 and 28, respectively, of the shelf 12*a* by any suitable means. Each fastener 50 includes a bulbous portion 54 which is connected by a reduced neck portion 56 to a cylindrical stem portion 58 in such a manner that an annular shoulder 60 is formed between the bulbous portion 54 and the stem 58. The bulbous portion 54 includes a plurality of resilient fingers 62 which are adapted to be compressed together in such a manner that the portion 54 will pass through an aperture 64 provided in the telephone bottom wall 20 and then expand to the position shown in FIGURE 5 whereby the bottom wall 20 is held captive between the portion 54 and the annular shoulder 60. Thus, the shelf 12*a* is conveniently connected to the telephone 16 in spaced relation with the bottom wall 20 so that it will not be left behind when the telephone 16 is moved while, at the same time, the shelf 12*a* may be readily removed from the telephone 16 if desired. The base member 10*a* is also provided with a felt-like member 30 on its undersurface to protect a desk or other piece of furniture upon which the telephone 16 may be placed. The base member 10*a* also differs from the base member 10 in that the recesses 14 are eliminated from the shelf 12*a* and a guide strip 66 is affixed to each end of the shelf 12*a* along the inner edge 68 of an associated block 51 to serve as guides for guiding the book into position on shelf 12*a* under the telephone 16. The strips 66 extend beyond their associated blocks to form recesses 14*a* therewith. The recesses 14*a* accommodate the telephone pads 18 when the base member 10*a* is attached to the telephone 16. Of course, it is apparent that the strips 66 also can be used with the FIGURE 2 embodiment.

While the particular telephone base members herein shown and described in detail are fully capable of attaining the objects and providing the advantages hereinbefore stated, it is to be understood that they are merely illustrative of the presently preferred embodiments of the invention and that no limitations are intended to the details of construction or design herein shown other than as defined in the appended claims.

What is claimed is:

1. In combination with a telephone having a rectangular bottom wall having spaced, parallel front and rear edges and spaced, parallel side edges, said side edges having a length exceeding that of said front and rear edges, and pad means mounted on each corner of said bottom wall for maintaining said bottom wall in spaced relation with a surface supporting said telephone, a telephone accessory comprising:

flat rectangular shelf means substantially corresponding in size to said bottom wall, said shelf means having front and rear edges and side edges; and attachment means affixed to and upstanding from the upper surface of said shelf at said front and rear edges of said shelf means and lying within the boundaries thereof, said attachment means engaging said bottom wall adjacent the front and rear edges thereof and maintaining said shelf means in fixed spaced relation with said bottom wall, said attachment means including body portions substantially filling the space between their corresponding front or rear pads and having inner edge surfaces aligned with the inner edge surfaces of the said telephone pad means at the corners of the telephone, whereby a space is provided between the bottom of the telephone and said shelf means to receive a book or pad to be guided laterally into said space by the inner edges of the attachment means and said pad means.

2. A construction as in claim 1 wherein said body portions have approximately the same thickness as said pad means.

3. A construction as in claim 1 wherein said shelf member is provided with corner recesses shaped to receive the said telephone mounting pads.

4. A construction as in claim 1 wherein said attachment means comprises permanent magnets at the front and back of the shelf having the same front-to-back dimension as the said telephone pads.

5. A construction as in claim 1 wherein said attachment means comprises fastener means having deformable heads engageable with apertures in the bottom wall of the telephone.

6. A construction as in claim 1, including a guide strip positioned against said inner edge surfaces of each of said attachment means and extending laterally past the inner edges of said pads.

7. A construction as in claim 6 wherein said attachment means has flat end surfaces, said end surfaces, the guide strips, and the said shelf forming recesses to receive the telephone pads.

References Cited by the Examiner

UNITED STATES PATENTS

| | | | |
|---|---|---|---|
| 1,675,788 | 7/1928 | Carr | 24—213 |
| 2,432,760 | 12/1947 | Higbee | 40—336 X |
| 2,678,833 | 5/1954 | Loeb | 281—15 |
| 3,052,056 | 9/1962 | Eisenstein | 40—336 X |
| 3,083,493 | 4/1963 | Malachuk | 40—336 X |

EUGENE R. CAPOZIO, *Primary Examiner.*

W. GRIEB, *Examiner.*